UNITED STATES PATENT OFFICE.

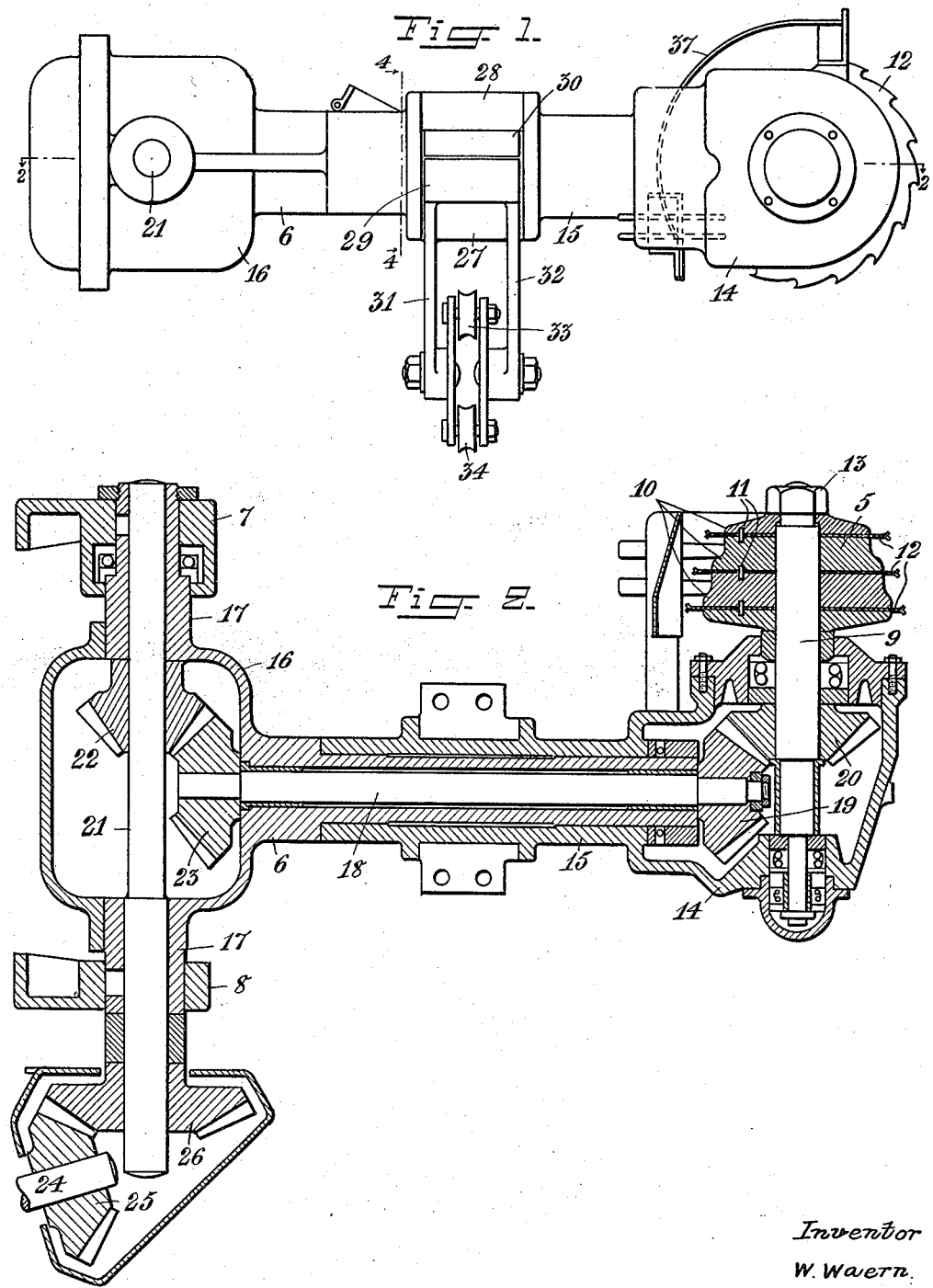

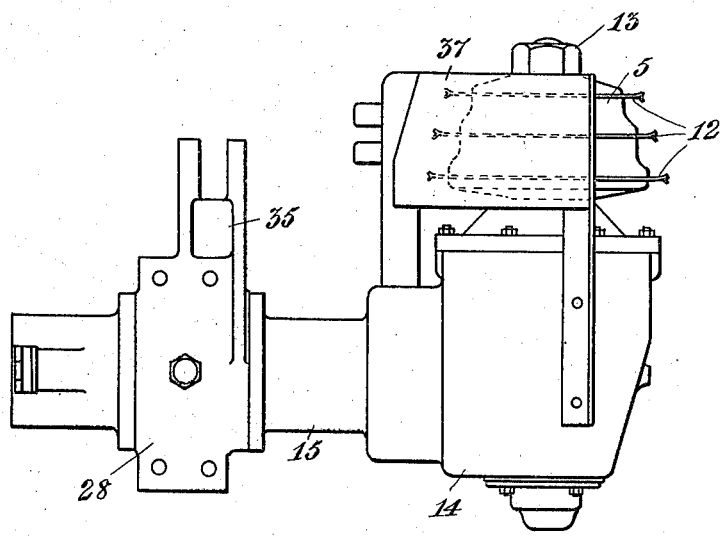
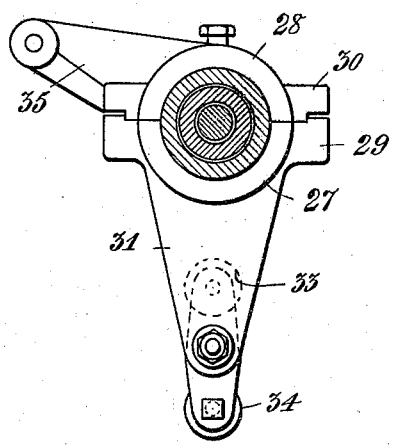

WILLIAM WAERN, OF STOCKHOLM, SWEDEN.

FEEDING DEVICE FOR BARK-STRIPPING MACHINES.

1,301,200.  Specification of Letters Patent.  Patented Apr. 22, 1919.

Application filed November 22, 1918. Serial No. 263,737.

*To all whom it may concern:*

Be it known that I, WILLIAM WAERN, engineer, subject of the King of Sweden, residing at 18 Rörstandsgatan, Stockholm, Sweden, have invented certain new and useful Improvements in Feeding Devices for Bark-Stripping Machines, of which the following is a specification.

The invention relates to a feeding device for bark stripping machines and the like which are provided with a rotating feeding device in the form of a roller provided with teeth or spikes and arranged at an angle relatively to the trunk. By means of said feed roller the trunk is rotated at the same time as it is moved lengthwise.

The invention has for its object to provide a mounting for said roller suitable for the adjustment of the roller relatively to the trunk and consists therein that the shaft of rotation of the feed roller is swingably mounted in bearings on an intermediate shaft arranged at an angle to said shaft of rotation said intermediate shaft being swingably mounted in a hanging position on a main shaft arranged at an angle to the intermediate shaft, so that the feed roller may be adjusted in different angular positions relatively to the trunk for the purpose of varying the rate of feed by being swung on the intermediate shaft, and moved forward or away from the trunk by being swung on the main shaft, the feed roller being arranged overhanging at the outer end of the shaft of rotation and at such a radial distance from the intermediate shaft that it may be raised and lowered by being swung on said shaft.

By this arrangement the advantage is attained that the feed roller can be brought farther in the angle between the cutter disk and the bed supporting the trunks, and thus trunks of a very small diameter may be worked. Further a greater adjustability of the feed roller relatively to the trunk is obtained.

The accompanying drawings illustrate an embodiment of the invention. Figure 1 shows the feeding device seen from the side. Fig. 2 is a longitudinal section on the line 2—2 in Fig. 1. Fig. 3 shows the feeding device seen from above and Fig. 4 is a cross section on the line 4—4 in Fig. 1.

The feeding device chiefly consists of a feed roller 5 mounted in bearings on an arm 6 which in turn is swingably supported in a hanging position by two fixed horizontal bearings 7 and 8 on the bark stripping machine in such a way that the feed roller bears against the trunk during the operation of the machine. The feed roller 5 is composed of a number of distance disks 10 provided at the outer end of a shaft 9, and a number of saw blades 12 arranged between said disks and fastened by means of transverse pins 11, said saw blades having a great width of set. The saw blades and the disks are so proportioned that the feed roller obtains chiefly a concial form, and are kept together by means of a nut 13. The feed roller is mounted in an overhanging position in ball bearings in a gear casing 14 provided with a tubular extension 15 through which the arm 6 passes, so that the shaft 9 of the feed roller may be swung in a plane at a right angle to the arm 6 for the purpose of changing the angular position of the feed roller relatively to the trunk. The inner end of the arm 6 is made in the form of a gear casing 16 provided with hollow journals 17 by means of which the whole feeding device is carried in the bearings 7 and 8. The shaft 9 is driven from a shaft 18 provided in the arm 16, by means of a bevel gear 19, 20, and the shaft 18 is driven from a shaft 21 journaled in the hollow journals 17, by means of a bevel gear 22, 23. The shaft 21, on the other hand, is driven from a shaft 24 by means of a bevel gear 25, 26. At the inner side of the feed roller a protecting plate 37 is arranged, fastened to the gear casing 14.

Provided on the tubular part 15 is a sleeve divided in two parts 27 and 28 which are kept together by means of bolts passing through flanges 29, 30 on the parts 27, 28. The lower part 27 is provided with two arms 31, 32 carrying two guide rollers 33, 34 adapted to operate on each side of a curve-shaped fixed guide bar (not shown). The upper part 28 of the sleeve is provided with an arm 35 projecting sidewise, the outer end of which is connected with a suitable counterweight for balancing the weight of the feed roller 5.

The adjustment of the feed roller 5 is effected by means of machine power in such a manner that the roller is first raised so that the trunk can be placed on the machine, and then lowered till the roller bears against the trunk. This is effected by lifting the arm 6 the tubular part 15 being then actuated by the above mentioned fixed guide bar arranged between the guide rollers 33, 34, in such a manner that, at the same time, said part 15 is turned on the arm 6. The feed roller will thus obtain a double movement upward, viz. partly by the arm 6 being turned on the shaft 21 and partly by the shaft 9 being swung on the arm 6.

Having now described my invention and in what manner the same is to be performed I declare that what I claim is:—

A feeding device for bark stripping machines and the like which are provided with a rotating feeding roller arranged at an angle relatively to the trunk and by means of which the trunk is rotated at the same time as it is moved lengthwise, characterized by the fact, that the shaft of rotation of the feed roller being swingably mounted in bearings on an intermediate shaft arranged at an angle to said shaft of rotation, said intermediate shaft being swingably mounted in a hanging position on a main shaft arranged at an angle to the intermediate shaft, so that the feed roller may be adjusted in different angular positions relatively to the trunk for the purpose of varying the feed by being swung on the intermediate shaft, and moved toward and away from the trunk by being swung on the main shaft, the feeding roller being arranged overhanging at the outer end of the shaft of rotation and at such a radial distance from the intermediate shaft that it may be raised or lowered by being swung on said shaft.

In testimony whereof I affix my signature in presence of two witnesses.

WILLIAM WAERN.

Witnesses:
JACOB BAGGE,
CHARLES H. LOFELY.

Copies of this patent may be obtained for five cents each, by addressing the "Commissioner of Patents, Washington, D. C."